United States Patent
Ibbott

[19]

[11] Patent Number: 6,165,339
[45] Date of Patent: Dec. 26, 2000

[54] APPARATUS AND METHOD FOR CONTROLLING MOLECULAR CLUSTER IN FLUID

[75] Inventor: Jack Kenneth Ibbott, Tokyo, Japan

[73] Assignee: Makiko Yoshida, Tokyo, Japan

[21] Appl. No.: 08/747,027

[22] Filed: Nov. 7, 1996

Related U.S. Application Data

[60] Provisional application No. 60/006,297, Nov. 7, 1995.

[51] Int. Cl.[7] .................................. C02F 1/46; C02F 1/48
[52] U.S. Cl. ...................... 204/554; 204/557; 204/571; 204/660; 204/664; 204/670; 204/671; 204/672; 204/673; 205/742; 205/745; 210/222; 210/695; 210/748
[58] Field of Search ...................... 204/554, 557, 204/571, 660, 664, 670, 671, 672, 742, 745; 210/222, 243, 695, 748; 95/28; 96/1, 3; 205/742, 745

[56] References Cited

U.S. PATENT DOCUMENTS

| | | | |
|---|---|---|---|
| 3,846,300 | 11/1974 | Inoue | 210/47 |
| 4,248,707 | 2/1981 | Granger | 210/695 |
| 4,564,448 | 1/1986 | O'Meara, Jr. | 210/222 |
| 5,378,362 | 1/1995 | Schoepe | 210/222 |

OTHER PUBLICATIONS

D. Hadfield, Permanent Magnets and Magnetism, Iliffe Books Ltd., London, 1962, pp. 314–315, month of publication not available.

F.A. Lowenheim, *Electroplating*, McGraw–Hill Book Co., New York, 1978 month of publication not available, pp. 16–19.

Eric M. Rogers, "Physics for the Inquiring Mind", Princeton University Press, twelfth printing,1977 month of publication not available, pp. 535, 580.

Dr. Charles Wallach, "The Ion Controversy", Belle Lumiere Pty Limited (Australian Edition), 1983 month of publication not available, pp. 28–29, 40–41.

*Primary Examiner*—Kathryn Gorgos
*Assistant Examiner*—William T. Leader
*Attorney, Agent, or Firm*—Wenderoth, Lind & Ponack, L.L.P.

[57] ABSTRACT

An apparatus is provided for treating a liquid by controlling molecular clusters in liquid in which a very narrow electric or magnetic energy field produced by at least two electrodes or magnetic poles spaced apart by less than 1 mm is applied to a liquid with the length of the spaced apart electrodes or magnetic poles set transversely to the flow direction of the liquid passing through the pipe. The overall thickness of the electrodes or magnetic poles is less than 10 millimeters.

29 Claims, 3 Drawing Sheets

APPARATUS AND METHOD FOR CONTROLLING MOLECULAR CLUSTER IN FLUID

This application claims the benefit of U.S. Provisional Application No. 60/006,297 filed Nov. 7, 1995.

BACKGROUND OF THE INVENTION

1. Field of the Invention

The present invention relates to an apparatus and method for treating a liquid by controlling molecular cluster size in a liquid by applying an electric or magnetic field to a flowing liquid.

2. Description of the Related Art

A device for treating liquid by using two electrodes having different electrochemical potentials disposed inside of a pipe through which liquid flows is provided in U.S. Pat. No. 5,387,324 by the present inventor. In this device at least some of the electrically conductive material of one of the electrodes is disposed downstream of all of the electrically conductive material of the other of the electrodes, so that liquid flowing axially through the pipe sequentially contacts the electrodes and is only acted on by the downstream electrode before flowing from the pipe. By using a carbon electrode on the upstream side and an iron electrode on the downstream side, the device will remove iron oxide coloration of the liquid.

Also provided by the present inventor is a method and apparatus for preventing the deposition of calcium and magnesium scale, as shown in U.S. Pat. No. 5,480,522, by which positive and negative electrodes of electrically conductive materials having different electrochemical potentials are provided on the outer peripheral surface of an electrically insulating tubular member through which the liquid flows. The positive and negative electrodes are tubular shaped and disposed in a spaced relationship or in direct physical contact. An electroconductive connection between the electrodes is established through the body of liquid by a capacitive effect so that the liquid is ionized.

While conducting continuous research and development on the method and device of the type set forth above, it became apparent to the present inventor that an electric field or magnetic field between electrodes or magnetic poles set transverse to the flow direction of the liquid can effect the molecular cluster size of that liquid. That is, in liquids which exhibit molecular clustering such as water, etc. the cluster formation is not constant. The molecular clusters are in a continual state of change, forming clusters, breaking down, and reforming clusters. Also the cluster size is a continually changing condition, some molecules forming large clusters and others forming small clusters. The clustering build-up and change is a continuous fluctuation. This continuous fluctuation of clustering and cluster size shows the very weak bonds which are the cause of the clustering. There is insufficient bond strength to maintain a constant cluster size and even temperature changes or movement of the liquid itself can have an appreciable effect on the cluster condition, therefore, it can be easily seen how a low level magnetic field or a low level electric field can control the clustering effect.

SUMMARY OF THE INVENTION

The present invention is based on the above findings and, accordingly, an object of the present invention is to provide an apparatus and method which treat a liquid for reducing molecular cluster size in the liquid by the application of an electric field or magnetic field.

To achieve the above object, the present invention provides an apparatus in which a very narrow electric or magnetic energy field produced by at least two electrodes or magnetic poles spaced apart by less than 1 mm is applied to a liquid with the length of the spaced apart electrodes or magnetic poles set transversely to the flow direction of the liquid passing through a pipe. The overall thickness of the electrodes or magnetic poles is less than 10 millimeters.

Preferably, the present apparatus comprises a first annular thin electrode member having a thickness, the first annular thin electrode member encircling the pipe; and a second annular thin electrode member having a thickness, the second annular thin electrode member encircling the pipe; wherein the first annular thin electrode member and the second annular thin electrode member are spaced apart by less than 1 millimeter, and a combined thickness of the first annular thin electrode member and the second annular thin electrode member is less than 10 millimeters.

The first annular thin electrode member and the second annular thin electrode member can be disposed within the pipe.

Alternatively, the pipe may have a first pipe section and a second pipe section, and the first annular thin electrode member and the second thin electrode member can be disposed between the first and second pipe sections with a portion of the first and second annular thin electrode member being exposed to the interior of the pipe.

Also, according to the present invention, the first and second annular thin electrode members set forth above can be replaced with first and second thin magnetic pole pieces, respectively.

The first and second annular thin electrode members have different electro-chemical potentials as a self generating electric field or can be energized from an external electric supply source.

The first and second thin magnetic pole pieces can be those connected to a permanent magnet or energized by electromagnetic means.

The principle of the present invention shall be described with reference to a magnetic head for recording and reproducing sounds on and from a magnetic tape, since it has some similarity with the present invention.

It is well known and understood in the electric world of tape recording that the quality and frequency range of recording and reproduction is controlled by the width of the electro-magnetic gap in the direction of the tape movement, and that smaller magnetic gaps considerably enhance the range of recordable frequencies, and with such narrow magnetic fields a reduced speed of the tape travel is made possible without causing deterioration of the frequency range which can be recorded and reproduced.

The present invention can be considered in the view that the liquid flow is equivalent to the moving magnetic tape, and the very narrow spacing of electrodes or magnetic poles is equivalent to the required very narrow electro-magnetic gap of a tape recording and reproducing head.

In the case of liquid treatment, and in particular water or any liquid which has a water content, or any liquid which has the grouping of molecules to form clusters similar to water, the effectiveness of the very narrow electrodes spacing and/or electro-magnetic gap is directly related to the molecular cluster size existing in the liquid.

For ease of explanation of the invention the description and details will be given as related to water, however, as explained above the invention relates to any liquid, other than water, which has the cluster forming effect.

In the case of this invention whereby a liquid is to be treated, the electric or magnetic transverse field is constant and has no intensity variations as compared to the magnetic tape recording. However, the moving liquid which may be viewed as the moving tape contains variations of energy due to the formation of molecular clusters, and maybe viewed as a recorded tape. To erase the recorded signals on a magnetic tape it may be passed through a magnetic field either polarized or at low frequency e.g. 50 cps., or a similarly polarized or oscillating e.g. 50 cps. electric field, and by so doing the grouping and impressed rearrangement of the magnetic component of the tape is broken down and allowed to assume its natural condition. Similarly the liquid passing through the narrow transverse electric or magnetic field is exposed to the effect of the field and the clusters formed by molecular grouping are disturbed by the induced electric or magnetic effect which causes changes to the very weak bonding between the molecules and accordingly the molecular clusters are reduced to smaller clusters.

In the case of natural water, research by the inventor has shown that the molecular clusters can be extremely large, up to 1 to 2 millimeters down to less than micron size, if considered as being spherical shape, although it is expected that the clusters could form any shape including that of being generally spherical. The relationship and efficiency of the device of this invention is the control of the molecular clusters and preferably causing a reduction to minimum size clusters. It is considered by the inventor that clusters would appear as very small changes in density.

Accordingly, the essential feature of this invention is in the use of a very narrow electric field or magnetic field with the length of the narrow field transverse to the flow direction of the liquid to control the molecular cluster size of that liquid. In the case of an electric field, very thin electrodes with a very narrow separation of the electrodes, are positioned transverse to the flow of liquid, similarly in the case of using a magnetic field the pole pieces should have a minimum separation to form an extremely narrow magnetic field, and with the length of the minimum separation set transverse to the flow of liquid.

In order for the device to be effective for cluster size reduction the effective width between the electrodes or magnetic pole pieces should be less than the cluster size, for example a cluster size of 1 mm (assumed to be the maximum dimension of the cluster) would require a narrow spacing with a width parallel to the direction of liquid flow of less than 1 mm, however any cluster having dimensions less than the width of the spacing would be unaffected. Therefore, in order to achieve efficiency and maximum control over the greatest number of molecular clusters, the width of the spacing should be the minimum. However, there are certain limitations on the physical size of a device in relation to molecular cluster size of a liquid, and for the present this physical size limitation must be accepted. However, it can be clearly understood that the manufacturing technology will improve allowing for further reduction in the physical electrode spacing width or electro-magnetic/magnetic gap width.

In a practical way, as in the tape recording and reproducing heads, the pole pieces can be in actual physical contact with each other and it is only the break in continuity of the material of the pole piece which allows a magnetic field to extend away from the pole pieces at the point of physical contact. This construction is also applicable in this invention. Also electrodes to produce a very narrow field may be in direct physical contact, and similarly an electric field is caused to extend away from the electrodes at the point of physical contact. However, in both cases of magnetic pole pieces and electrodes an extremely thin spacer of non-magnetic material or electrically insulating material may be used between the faces of the magnetic pole pieces or electrodes to provide a more clearly defined magnetic gap or narrow electric field.

It is understood however, that employing some spacing medium between the magnetic pole pieces or the electrodes does provide a wider transverse electric or magnetic field which is a disadvantage. However, as an advantage, the employment of a spacer does provide a more intense magnetic or electric field. In actual practical application, a compromise condition must be accepted which allows the maximum of efficiency with the cluster size being reduced to an appropriate size suitable for the particular application or requirement.

In view of the fact that the liquid should be exposed to a minimum effect from the physical magnetic pole pieces or the electrodes, it has been found that the least effect from the pole pieces or electrodes is achieved when these pole pieces or electrodes expose a minimum thickness in the direction of the liquid flow.

A series of tests were made in an effort to decide the optimum thickness of the pole pieces or electrodes and it was found that as the thickness of the poles pieces or electrodes was reduced to a minimum attainable thickness, the efficiency of the device increased. Experimental thickness tests of that part of the pole pieces or electrodes which is contacting the outer surface of the non magnetic pipe or the plastic pipe were made, and a thickness as small as a few microns was used. It was found that the electrodes could be used in complete form at a few microns with a resulting upgrade in efficiency. However, for the magnetic pole pieces such an overall thickness was impractical; therefore, the pole pieces were formed to be wedge shaped thereby allowing the edge of the pole piece in contact with the outer surface of the non-magnetic pipe to be reduced to a few microns. For electrodes, the overall thickness need only be in the order of a few microns, enough to provide sufficient mechanical rigidity. A preferred maximum overall thickness of the electrode set or magnetic pole set would be in the order of 10 mm.

According to this invention, the electrodes should be very thin, preferably down to a few microns. It will be understood that with such thin electrode members rigidity becomes a severe problem, especially when trying to assemble a full encircling member only a few microns thick. Thus, it can be understood that the term "annular member" used herein, also includes an encircling member formed by segments which are not necessarily continuous.

It is pointed out that the efficiency of the device increases with decreasing thickness of the electrodes and active face of magnetic pole pieces. The device is functional with thick electrodes or pole pieces, but the efficiency peaks with a thickness of only a few microns for the electrodes or the active face of the magnetic pole pieces. The above conditions were found to prevail regardless of the diameter of the insulating plastic pipe or non-magnetic pipe, and in the case of the electrodes being attached on the outer periphery of the center pipe the thickness of the insulating plastic pipe or the non-magnetic pipe does not provide any obstruction to the effect on the molecular clusters. For example with the self generating electrode system of positive and negative electrodes having different electro-chemical potentials, units have been made using internal pipe dimensions from ½" up to 10" and with the pipe wall thickness ranging between 2 mm up to 8 mm. Tests with these large size ID pipes and wall thickness showed no obvious loss in efficiency.

The fact of being able to use large diameter pipe and thick pipe wall may seem to be illogical according to average thinking and especially so when as mentioned previously the magnetic tape recording system was used to illustrate the function of the device and effect on the molecule clusters. However in the case of pipe wall thickness and large pipe diameter, there can be no comparison with magnetic tape. It is pointed out that the electrodes and magnetic pole pieces encircle the pipe OD or the pipe ID and the resulting field effect is completely different to that of the tape reproducing or recording head which only contacts the narrow strip of magnetic tape. Furthermore, it has been found from actual experimental results that the effect of the electric or magnetic field when applied to the outer periphery of the plastic or non-magnetic pipe section does indeed extend through the pipe wall and produces an effect on the liquid contacting the inside surface of the pipe. However the effect is not limited to the particular liquid contacting the pipe wall but the effect is transmitted throughout the liquid by a chain-like reaction. The size change of the cluster in close proximity to the pipe wall produces a change of electric charge which then effects the next cluster. It is understood that those clusters in close proximity to the pipe wall will be most strongly effected, and to achieve a homogeneous condition recirculation of the fluid through the device will provide increased distribution of the cluster size control.

In order to provide a clear understanding that the effect of the very narrow electric field or magnetic field can be transmitted through the thick walled piping, the following explanation is provided.

Firstly, we consider a plastic pipe with water flowing through the pipe. It is well known that any form of friction on the one surface of a plastic pipe will cause an electrostatic field to develop on the other surface of the pipe. If some form of distortion or disturbance is applied to the electrostatic field on the outer surface of the plastic pipe, it will similarly be reflected back as a disturbance or distortion on the inside of the plastic pipe. This disturbance or distortion on the inside of the plastic pipe is also reflected into the water as an electrostatic effect on the water.

Similarly with the non magnetic pipe, whether it be metal or otherwise, an electrostatic field, or ionization, will be produced on the outer surface of the pipe. An applied field causes a disturbance, or distortion, of the electrostatic field which is reflected back into the water. As evidence that electrostatic fields do develop on a metal, the inventor directs attention to the book "The Ion Controversy" by Dr. Charles Wallack. Dr. Wallack describes how a ship moving through the water builds up a charge of the positive ion (a positive electrostatic charge). The effect of this positive ion charge is reflected through the thick metal hull of the ship into the inside, and appears as a reduced minus ion level (a reduced negative electrostatic charge) within the ship's hull up to the waterline. Above the waterline the ionization is unaffected.

DETAILED DESCRIPTION OF THE PREFERRED EMBODIMENTS

Figure 1:
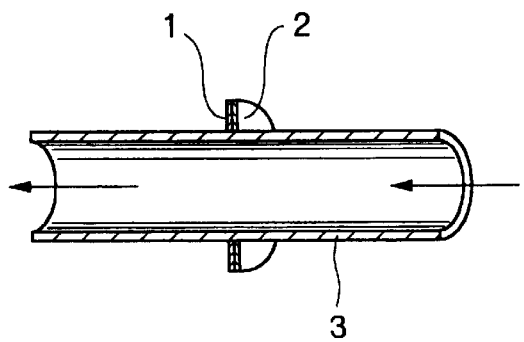
FIG. 1 is a half-sectioned schematic perspective view showing a device and a method for treating a liquid by applying a narrow electric field encircling a pipeline liquid flow system according to a first embodiment of the present invention.
Figure 8:
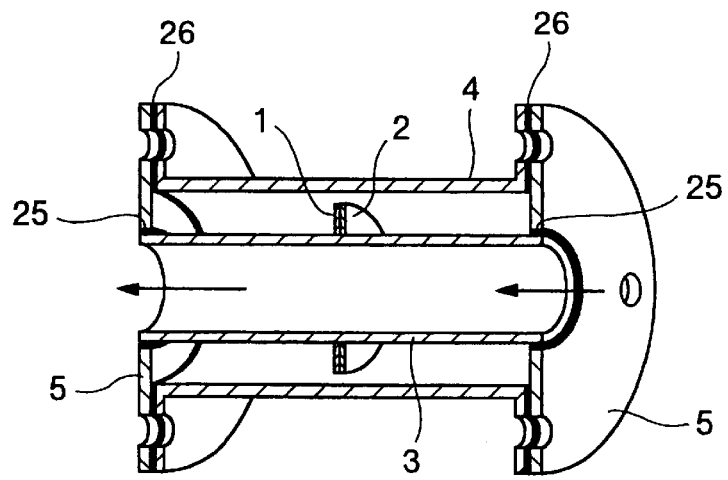
FIG. 8 is a half-sectioned schematic perspective view more closely showing the construction of a unit employing the self generating electric field electrodes according to the first embodiment of the present invention.

Referring to a first embodiment of the present invention shown in FIG. 1, two electrodes comprising a positive electrode 1 and a negative electrode 2 are attached to and encircling the outer periphery of a plastic pipe 3. The positive electrode 1 and negative electrode 2 have different electrochemical potentials, for example a carbon positive electrode and an aluminum negative electrode. The carbon and aluminum electrodes are made from extremely thin carbon and aluminum sheets, and placed directly in physical contact or with a very thin film of electric insulation therebetween. The electrode set is attached to, and encircle the outer periphery of an electric insulating pipe 3 such as a length of plastic pipe. A more detailed drawing of unit construction employing such a set of electrodes is shown in FIG. 8, in which 1 and 2 are the carbon and aluminum electrodes respectively. The electrodes 1 and 2 are attached to, and encircle the outer periphery of a plastic pipe 3. The assembly of electrodes 1 and 2 and the plastic pipe 3 is enclosed in an outer body 4 and end face plates 5. The inner periphery of the face plates 5 is grooved to accept an O-ring 25 which forms a tight seal between the ends of the plastic pipe 3 and the end face plates 5. Seal packings 26 form a tight seal between the end face plates 5 and the outer body 4 to maintain a constant environment and moisture free condition around the electrode.

Figure 2:
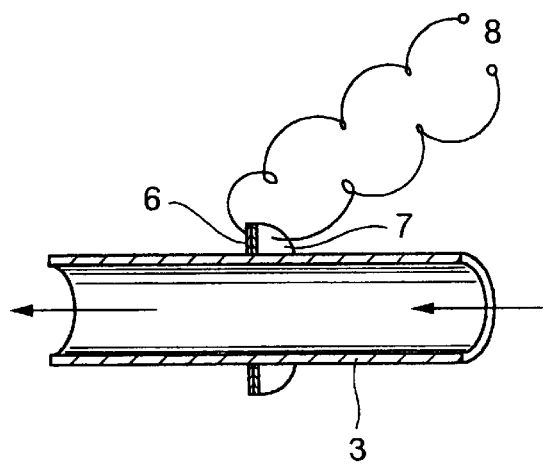
FIG. 2 is a half-sectioned schematic perspective view showing a device and a method for treating a liquid by applying a narrow electric field encircling a pipeline liquid flow system according to a modification of the first embodiment of the present invention.

In FIG. 2, a similar system to that of FIG. 1 is adopted, except that the electrodes 6 and 7 are energized from an external electric supply source 8. The electrodes 6 and 7 may be made of any electro-conductive material, preferably both electrodes should be of the same material. A length of electric insulating pipe 3 is used to support the electrode set 6 and 7.

Figure 3:
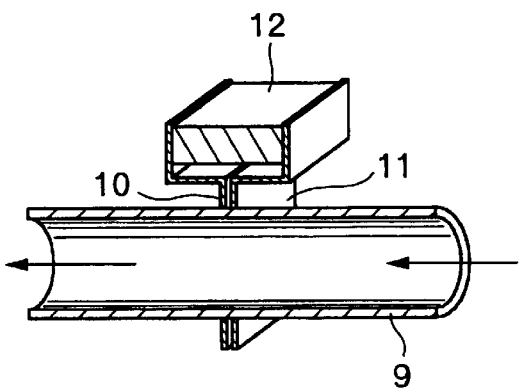
FIG. 3 is a half-sectioned schematic perspective view showing a device and a method for treating a liquid by applying narrow magnetic fields encircling a pipeline liquid flow system according to a second embodiment of the present invention.

In FIG. 3 a magnetic system is adopted instead of electrodes in FIGS. 1 and 2, in which 9 is a section of non magnetic pipe with the magnetic pole pieces 10 and 11 encircling edgewise the periphery of the pipe 9 and with the magnetic pole pieces 10 and 11 being magnetically energized by the magnet 12.

Figure 4:
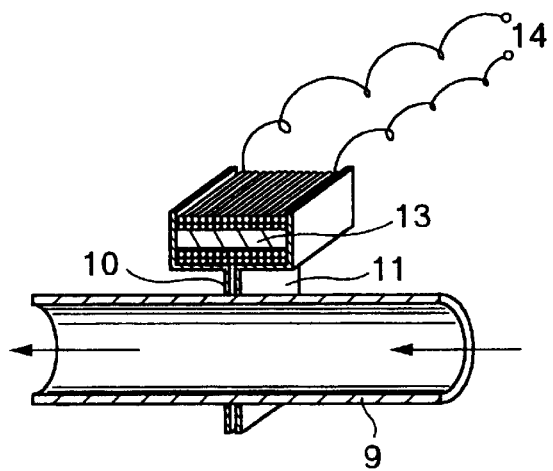
FIG. 4 is a half-sectioned schematic perspective view showing a device and a method for treating a liquid by applying narrow magnetic fields encircling pipeline liquid flow system according to a modification of the second embodiment of the present invention.

In FIG. 4 the same system of a magnetic transverse assembly is adopted but employing an electro-magnetic system for energizing. The electro magnet 13 is powered by an external electric supply source 14.

Figure 5:
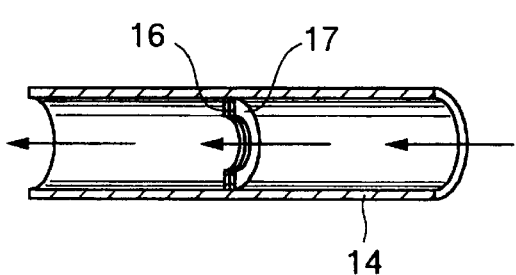
FIG. 5 is a half-sectioned schematic perspective view showing a device and a method for treating a liquid by applying a narrow electric field within a pipeline liquid flow system according to a third embodiment of the present invention.

In the devices shown in FIG. 1 through FIG. 4, the narrow energy field members are applied to, and encircle the external periphery of the supporting pipe section, while the narrow field members 16 and 17 are applied within the pipe section 14 in FIG. 5. In FIG. 5 the self generating electrodes 16 and 17 are situated within the electric insulation pipe section 14 and directly contacted by the liquid.

Figure 6:
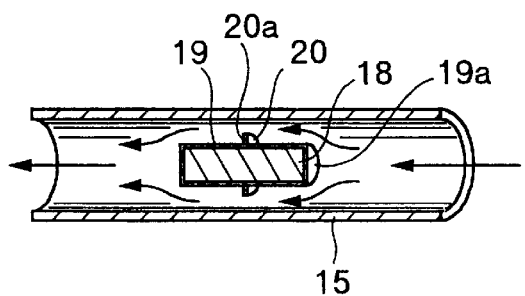
FIG. 6 is a half-sectioned schematic perspective view showing a device and a method for treating a liquid by applying narrow magnetic fields within a pipeline liquid flow system according to a fourth embodiment of the present invention.

In FIG. 6 a permanent magnet system is situated within the pipe section 15 in which the permanent magnet 18 is applied with end covers 19 and 19a joining at the center to form the pole pieces 20 and 20a. In the drawing the pole pieces 20 and 20a are shown at the center of the permanent magnet length. However, it will be apparent that the joining of the end covers and forming the pole pieces 20 and 20a can be positioned at any point in the overall length of the permanent magnet.

Figure 7:
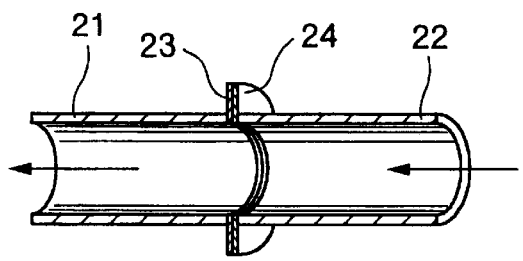
FIG. 7 is a half-sectioned schematic perspective view showing a device and a method for treating a liquid by applying a narrow electric field to a pipeline liquid flow system according to a fifth embodiment of the present invention.

In the construction shown in FIG. 7, two separate pipe sections 21 and 22 are employed with the narrow field producing members 23 and 24 being situated between the sections 21 and 22. In this embodiment the various systems may be employed; the self generating electrodes having different electro-chemical potentials, the externally electrically energized electrodes, the magnetic poles of a permanent magnet or electro-magnet. For convenience only the illustration of the self generating electrodes having different electro-chemical potentials is shown with the electrodes 23 and 24. It will be obvious in view of FIG. 1, FIG. 2, FIG. 3 and FIG. 4 that the electrodes and pole pieces illustrated in these figures could be inserted between two pipe sections as illustrated in FIG. 7. Although the description of the structure of the device of this invention is based on only one set of electrodes or one set of magnetic pole pieces, it is pointed out that any number of electrodes or pole pieces may be used. It is further pointed out that with the self generating electrode construction, other electrode sets may be of different materials to those of the first electrode set. The important factor is that there is the minimum separation between electrodes or magnetic poles and such separation allows a very narrow electric fields or magnetic field to be produced.

To any one skilled in the art it will be obvious how there is a magnetic field effect produced in the liquid flow either from a so called permanent magnet or an electro-magnetic system. Furthermore, it can be clearly understood how electro-conductive materials having different electro-chemical potentials can provide a voltaic cell structure when contacted by an electrolyte, such as water or other liquids, even those being only very weak electrolytes such as sauces, whiskey, wine, etc. However, in the case of the externally applied electrodes having different electro-chemical potentials where there is no contact with the liquid, as in the cases of FIG. 1, and FIG. 8, the system of electric energy generation is somewhat different.

To explain the function of the devices of FIG. 1 and FIG. 8, attention is directed to the electric insulating pipe (plastic) as 3 in FIG. 1, and FIG. 8. It is commonly known that many plastic materials have the effect of producing an electrostatic field when excited by some friction of the surface. Referring to water flowing through a plastic pipe, the friction of the water flowing through such a piece of plastic pipe produces an electrostatic voltage field which builds up on the outer surface of the plastic pipe. This means that the outer surface of the plastic pipe is covered by an electrostatic field. The electrodes of different electro-chemical potential, for example carbon and aluminum are contained within the electrostatic field, and the electrostatic field is seen as an electrolyte.

To explain this further, an electrostatic field is an ionized form, either positive ion or negative ion. An electrostatic field has a conductivity due to the ionization, which in effect is similar to liquids such as water in which the soluble content is ionized due to solution, and therefore becomes electroconductive. All materials especially those which are electrically conductive have an electron field surrounding them. This may be likened to an electron gas. With two members of different electrochemical potential situated in close proximity to each other in air and with suitable equipment it is possible to measure a potential difference between the two members. However due to the poor conductivity of the air, the potential developed is extremely weak. When these same two members are immersed in water in which the dissolved salts cause relatively strong conductivity, the potential difference between the members has more energy and can produce a relatively strong electric current flow.

Carbon will absorb electrons; and aluminum will release electrons. Therefore, in the vicinity of the carbon electrode there is a reduction of electrons and in the vicinity of the aluminum electrode there is an excess of electrons, this provides a potential difference between the carbon electrode and the aluminum electrode, with a resulting electric potential being present in the narrow gap between the electrodes. Other combinations of electro-conductive materials having different electro-chemical potentials will also show a potential difference due to the effect of a difference in the efficiency to release electrons, in which a low electron release material will become positively polarized as related to a high electron release material. Therefore, any electro-conductive materials with different electro-chemical potentials will show an electric potential difference when exposed to an electrostatic field.

In liquids which exhibit molecular clustering such as water, etc. the cluster formation is not constant. The molecular clusters are in a continual state of change, forming clusters, breaking down, and reforming clusters. Also the cluster size is a continually changing condition, some molecules forming large clusters and others forming small clusters. The clustering build-up and change is a continuous fluctuation. This continuous fluctuation of clustering and cluster size shows the very weak bonds which are the cause of the clustering. There is insufficient bond strength to maintain a constant cluster size and even temperature changes or movement of the liquid itself can have an appreciable effect on the cluster condition; therefore, it can be easily seen how a low level magnetic field or electric field can control the clustering effect.

As a molecular cluster which is large in relation to the narrow field passes through the narrow field, the energy, electric or magnetic, causes a change of the weak molecular bonds and the cluster changes to a size which is relative to the width of the narrow field. A liquid which passes through the narrow field only one time will have only portion of the molecular clusters reduced in size, but such treatment is often sufficient for a particular requirement. However, recirculation of the liquid through the narrow field can provide highly efficient control of the cluster size. As mentioned above, the clusters are in a constant state of change under normal conditions. The application of a device according to this invention does stabilize the state of cluster formation. In the case of sauces, whiskey, wine etc. the reduced cluster size allows quick blending of the water content with the sauce base, whiskey, wine, etc. and once the blending has formed it does not again separate. In other words the liquids have been conditioned into small clusters which are held stable by the blending. In the case of a conditioned liquid which is not blended with a second liquid, the controlled cluster size will remain in such condition for a relatively short time and unless otherwise used in some manner to take advantage of the cluster control, the clustering effect within that liquid will gradually revert to the fluctuation of cluster formation and cluster break down.

Another effect of the molecular cluster size control is that of increased ionization of the liquid and the delayed precipitation of dissolved content of the liquid. In the case of natural water with the dissolved content, (solute) of calcium salts, magnesium salts, etc., the action of reducing the cluster size allows a change of electric charge within the liquid which is a change of ionization of the liquid and dissolved content. In this sense, the device structures of this invention may be used for water treatment to prevent scaling (calcium and magnesium scale, etc.) within a water containment system.

In order to provide evidence of the effect of molecular cluster control by the devices of this invention some tests were carried out. The device used had the narrow spaced field members attached to the outer periphery of a plastic pipe with ½" (12.7 mm) bore and wall thickness of 1.5 mm. The system used was that of electrode materials having different electrochemical potentials as shown schematically in FIG. 1 and a similar construction to that shown in FIG. 8. In this case, segmented carbon and aluminum electrodes were used to encircle the pipe. In view of the various possibilities of construction to have the electrode assembly or magnetic pole encircling the OD or ID of the pipe, we would refer to these structures combined as annular members, e.g. the segmented carbon and aluminum electrode, and the one piece electrodes are referred to as annular members. The carbon and aluminum elements were in direct physical contact (no separator was used between the electrodes). Also to make the electrode assembly more rigid the electrode set was supported by members of a more rigid insulative material. The combined thickness of the electrode assembly and supporting members was 0.25 mm, with the actual thickness of the carbon and aluminum electrode combination being 0.01 mm.

Test of Delayed Precipitation (Anti-scaling)

The basic method of comparison between a treated sample of liquid and a not treated sample from experience appears to be the most reliable and is also applied in this test. Two sample volumes of water were taken from the one storage tank. The one volume remained untreated whereas the other volume was allowed to pass one time through a device of this invention. An exactly measured amount of each sample volume (not treated and treated) was placed in identical glass beakers, then placed over a heating device to simultaneously heat the samples equally and allow evaporation of the water. The two samples were raised in temperature to 75° C. and then maintained at that temperature to allow evaporation of the two samples. This initial volume of each sample was 100 cc and this was allowed to evaporate down to 50 cc, at which point some precipitation of the dissolved content (solute) of the water had occurred. The residual samples were corrected to exactly the same volume (50 cc) by adding pure water, then allowing the samples to stand for a few hours in order for the excess precipitate to be redissolved. A measurement of electro-conductivity was taken of each sample which showed a considerably lower electro-conductivity for the not treated sample than that of the treated sample. A difference of 16 $\mu$S/cm has been measured between the not treated water and the water treated by the device of this invention. An electro-conductivity measurement is the general indication of the amount of dissolved salt content of the water such as calcium salts and magnesium salts. With a reduced amount of salt in solution the electro-conductivity will be lower. In the above test the electro-conductivity measurements showed a lower value for the not treated water than that of the treated water, and this can be taken as showing reduced content of the soluble salt in the not treated water, whereas the treated water showed a higher electro-conductivity than the not treated water thereby indicating a maintained high salt content in the water due to reduced precipitation, which as explained previously, is brought about by the change of electric charge with the change of the clusters to smaller sizes. The change of electric charge is also a change of ionization.

Evidence of the function of the narrow and magnetic field control effect was further investigated with specially devised tests. In one case, the water untreated was carefully degassed by vacuum then filtered through a 0.4 micron filter. A test rig of a small reservoir connected to a length of 2.0 mm capillary tube was set up. The water was drawn by vacuum through the capillary tube into the reservoir in order to eliminate the possibility of air being added to the water through the turbulence and general disturbance which could occur by simply pouring the water into the reservoir. When the reservoir was almost full, the water was allowed to flow out through the capillary tube. It was observed that instead of a smooth flow of water leaving the open end of the capillary tube, that there was a very irregular flow with the water flow being fast at times and slow at other times. This was easily observed by the variations in visible extension of the water flow from the capillary tube. It appeared to spurt out then slow down.

Some of the same water was passed through a device prepared with the construction then filtered and degassed as before. The same procedure was used to fill the small reservoir, then the water was allowed to flow through the capillary tube. This time the water flow from the open end of the capillary tube was completely smooth and had no irregular spurting action.

From this test it was assumed that the molecule cluster size in the water had been reduced, thereby allowing a smooth flow through the capillary tube. To verify this the 2.0 mm bore capillary tube was replaced with a 0.5 mm bore capillary tube, and the test repeated using the treated water. With this reduced size bore the water flow again became irregular in a similar manner to that of the untreated water through a 2.0 mm bore capillary tube. It appears obvious that the cluster size of the untreated water was variable to size in excess of 2.0 mm whereas the treated water showed the variable cluster size to be only in excess of 0.5 mm due to the effect of the device with narrow field construction.

Figure 9:
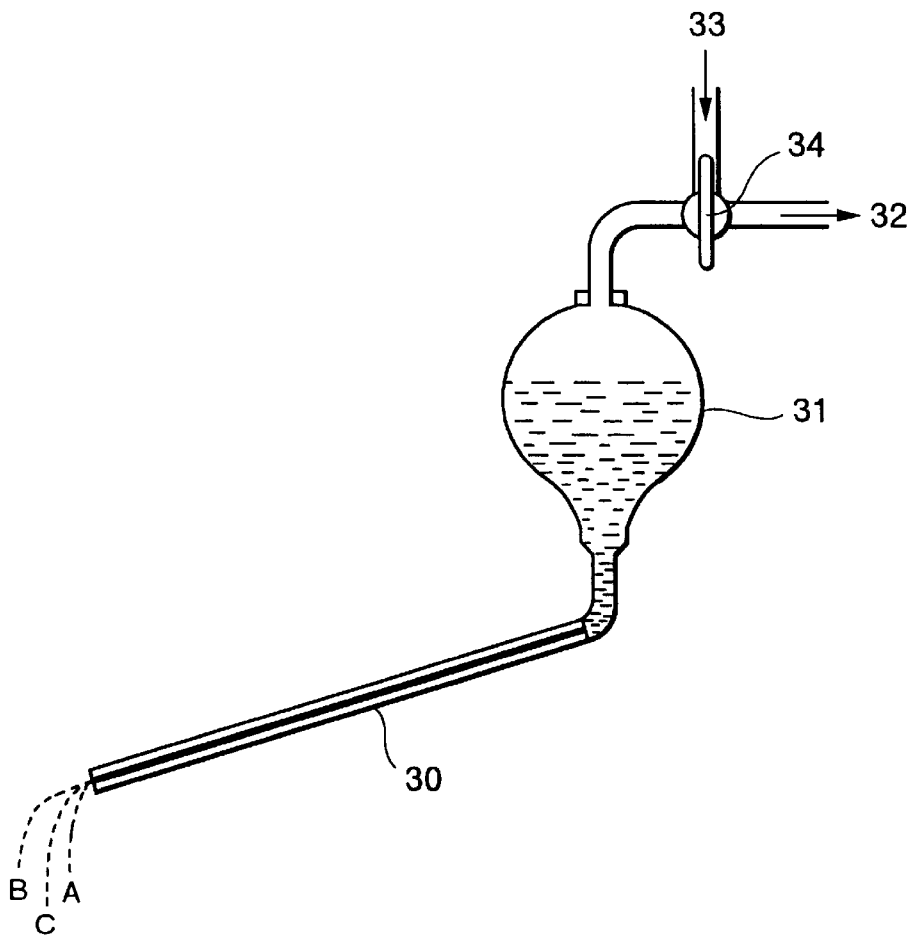
FIG. 9 is a schematic view of a test unit to illustrate surge effect in liquid flow due to cluster size.

An example of the device used for this test is shown in FIG. 9 in which 30 is the capillary tube, 31 the reservoir, 32 air out line to vacuum pump, 33 air in, and 34 a 3 way valve to switch from air out to air in. Letters A, B and C show the liquid flow from the capillary tube orifice in which A and B show the sudden flow surge for untreated liquid and C shows the steady flow for liquid treated by the device according to FIG. 1 and FIG. 8 of the invention.

This finding brought up two possibilities:
1) the number of molecules in the cluster was reduced; or
2) the number of molecules in the cluster remained the same but with tighter bonding to condense the cluster.

A further test was made to verify which of the above two possibilities had occurred.

In this test the weight of exact volumes of water was measured, the one volume being untreated water the other volume being water treated by the device. The weight was measured to an accuracy of 4 decimal places. A special volume measuring flask was prepared with a length of 1.0 mm bore capillary tube inserted. The water was filled into the special flask up to the exact level in the capillary tube, thereby for repeat fillings the volume of water (fluid) was accurate to a very high degree.

The weight of the measuring flask empty was taken showing 74.7670 grms. Tap water was used to fill the flask to the exact volume, and the flask +water was weighed showing 170.0295 grms. The flask was then completely emptied and then filled to the exact same level in the capillary tube with a volume of the same water which had been passed through (treated) by the device, then another weight measurement was taken. This time the weight showed 170.2315 grms, an increase of 0.202 grms. This kind of weight increase after treatment by the narrow transverse field device was repetitive, and therefore the effect of a weight increase could be taken as correct. The weight increase confirms that the cluster formation in the water still had the same number of molecules but was more condensed in size which then would provide the exact same volume of water with increase weight.

Figure 10:
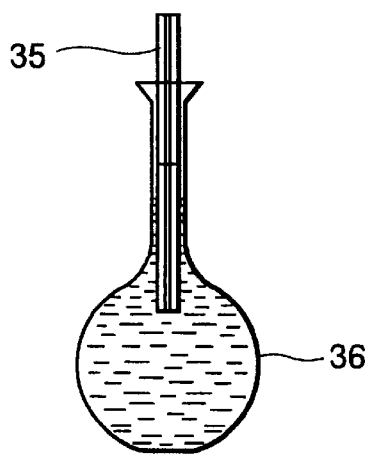
FIG. 10 is a schematic view of a device for weight measurement according to a test of the present invention.

An example of the device used in this test is shown in FIG. 10 in which 35 is the capillary tube and 36 the container. The container was filled with liquid up to the mark on the capillary tube to obtain exact volumes of liquid. Weight measurements were taken with the volume of untreated and of the exact same volume of liquid treated by the device of this invention.

A third test was made to further verify the decrease in cluster size. This time a method of volume expansion was used. Two exact volumes of water, one not treated and the other treated by the narrow field device, were carefully measured out. The two individual water volumes were placed in specially constructed measuring devices which were then heated in a water bath until there was no further expansion of the water. The expanded volumes were collected and weighed. Rigid control was taken at all stages of the test to ensure accuracy. The resulting measurements showed an increase in volume of the expansion for the treated water. A weight measurement was made to obtain higher accuracy than measuring volume. In this test, the treated water expansion was greater by 0.4% over that of the untreated water.

It may be generally stated that water is not compressible. This is correct when physical pressure is applied. But when some energy is applied to the molecular cluster structure of water it will expand or contract. When water is heated, there is a considerable amount of volume expansion. When water is cooled, there is also a considerable volume contraction until the temperature reaches 4° C. then water expands. Water treated by a narrow electric field or a narrow magnetic field according to this invention exhibits an effect similar to the thermal effect on water.

Figure 11:
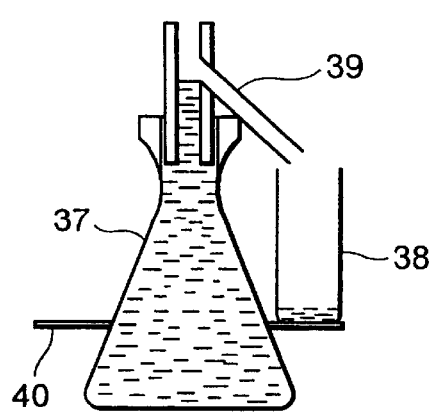
FIG. 11 is a schematic view of a device used for volume expansion measurement according to a test of the present invention.

An example of the device used for this test is shown FIG. 11 in which 37 is the container, 38 the collecting cup, 39 the overflow pipe, and 40 a circular plate surrounding the container 37 to support the collecting cup 38. The container was filled with liquid up to the overflow point for both the untreated liquid and the liquid treated by the device of this invention, then the device filled with liquid was heated in a water bath.

Test No. 3 confirms the result of test No. 2 and both tests No. 2 and No. 3 confirm test No. 1.

A chart showing the results of a series of tests using the above test devices is given below.

Weight Test:

|   | Water type | not treated water (grms.) | treated water (grms.) | increase (grms.) |
|---|---|---|---|---|
| 1 | tap | 95.2650 | 95.4675 | 0.2025 |
| 2 | tap | 95.2400 | 95.5630 | 0.2230 |
| 3 | tap | 95.6190 | 95.8142 | 0.1952 |
| 4 | high silica | 95.8120 | 95.8670 | 0.0550 |
| 5 | high silica | 95.8825 | 95.9316 | 0.0491 |
| 6 | high silica | 95.8141 | 95.8590 | 0.0449 |

Volume Expansion Test

|   | Water type | not treated water in collecting cup (grms.) | treated water in collecting cup (grms.) | increase (grms.) |
|---|---|---|---|---|
| 1 | high silica | 3.4763 | 4.3496 | 0.8733 |
| 2 | tap | 4.4100 | 4.8913 | 0.4813 |
| 3 | tap | 4.2130 | 4.8735 | 0.4605 |

Explanation of Chart

It is seen that different waters have been used for the test. In the case of water with a high silica content and accordingly low calcium, magnesium content, that on the ambient temperature test the weight increase or reduction of cluster size is less than that for tests using tap water with a relatively higher calcium, magnesium content. However in the chart showing volume expansion by heating the silica content water shows greater expansion than that for tap water. This is difficult to explain at this time, but it is thought that the thermal energy causes a different rate of expansion of the silica clusters. It is well known that silica solution in water does not show any electro-conductivity whereas calcium and magnesium, both produce strong electro-conductivity in water solution.

In order to provide evidence of the effect of molecular cluster control by the devices of this invention, further simple taste tests were carried out, although it is felt that the results of the above mentioned tests are sufficient as proof of the device function.

Sauces: In the manufacture of some sauces the addition of common salt (NaCl) is an essential part of the ingredients. However, these sauces cannot be used immediately following manufacture and a maturing period must be allowed for the NaCl to blend fully into the mixture and remove the strong salty taste. Such is the case in Japan in particular with Shoyu sauce, but the case does exist in many types of food manufacture. The use of the device of this invention will provide rapid blending of the NaCl into the sauce base. As a simple test and illustration of this effect, a small quantity of NaCl is dissolved in water until the salty taste is apparent. The volume of salted water is separated into two volumes. The one volume is passed through a device of this invention, the other volume remains untreated. A simple taste test will show that the salty taste of the treated volume of salted water has completely disappeared whereas the untreated volume of salted water still retains the salty taste. This very effectively illustrates the rapid change of molecular cluster size to allow a blending of two components of a mixture.

Wines: It is common knowledge and an essential part of wine manufacturing, to allow a maturing period for the full taste of the wine to develop. This means that the manufactured base wine must be allowed to stand over a period of time for maturing to occur. As in the case of sauces etc. a tasting method can be used to show the obvious difference in the wine before treatment and after treatment with the device of this invention. To make this test, a very cheap wine with an obvious acidic taste was used. Two volumes were taken from the same bottle of wine. The one volume remained untreated, whereas the other volume was passed through a device of this invention. The comparison tasting of the not treated portion and the treated portion showed a very obvious reduction of the acidic taste of the wine after treatment with the device. The wine taste had become mellow as would be the case with a matured wine. The maturing of wines etc. is again the result of cluster size reduction to allow blending of the components of the basic wine. The normal process is to allow time for the slow break down of the molecular clusters and ultimate close blending of the components. The above test allowing only one pass through a device of this invention showed immediate improved blending or maturing effect. A recirculation procedure with the wine passing through the device a number of times will provide even more complete blending and mellowing of the wine.

Whiskey: In the case of whiskey, the effect of treatment by the device of this invention is not so rapid and recirculation over a period of a few days is necessary to achieve the desired maturing stage. Again a test sample of a very cheap, not matured whiskey was obtained. A sample volume of this was placed in a recirculation device including a device of this invention in the recirculating system. The recirculation was allowed to run continuously and taste checks were made on a daily basis. The whiskey taste was obviously changed from day to day. After a 12 day test period, the raw whiskey taste had changed towards that of a well matured whiskey.

It is pointed out that to one skilled in the art of tasting wine or whiskey the above mentioned changes would be extremely obvious, especially with the "before and after" tasting as explained. The taste of a raw whiskey and a well matured whiskey leaves no doubt in the mind of one skilled in the art. Similarly with wine. The connoisseur is able to detect by taste the difference between a wine which is matured and one that is still raw. Even those unskilled in the art of wine tasting can easily detect the differences between the original raw wine (poor quality) and the mellowness of the wine after treatment with the device of this invention. This is evidenced by the fact that the taste testing was applied with various people but unfortunately these were not connoisseurs of whiskey or wine. However, the opinion in each cases was the same, that of a more pleasant and smooth taste. Similarly with the salt water test, each individual who was asked to taste the treated salty water agreed that the salty taste was not evident in the treated water. In the case of the salt water test, each person was asked to add the salt to the water until they could sense a mild salty taste, then compare this with the same salted water after being passed through the device. In this way the degree of saltiness in the water was set to the taster's own standard which then made it clear to that taster that there was indeed a taste change due to the effect of the device.

Although the present invention has been described with reference to preferred embodiments thereof, many modifications and alterations may be made within the spirit of the present invention.

What is claimed is:

1. An apparatus for use in controlling molecular clusters in a liquid, said apparatus comprising:
   a pipe through which the liquid is to flow in a flow direction, and
   an energy applying device comprising two electrodes or two magnetic pole pieces provided along a periphery of said pipe in a direction transverse to the liquid flow direction operable to apply one of an electric and a magnetic energy field to the liquid transversely to the flow direction,
   wherein the two electrodes or two magnetic pole pieces are spaced apart by less than 1 millimeter, and the overall thickness of said energy field applying device is less than 10 millimeters in a direction parallel to the flow direction.

2. An apparatus for use in controlling molecular clusters in a liquid as claimed in claim 1, wherein said energy applying device comprises at least two electrodes and said pipe is made of electrically non-conductive material.

3. An apparatus for use in controlling molecular clusters in a liquid as claimed in claim 2, wherein said energy applying device is provided on an outer peripheral surface of said pipe.

4. An apparatus for use in controlling molecular clusters in a liquid as claimed in claim 2, wherein said energy applying device is provided internally of said pipe.

5. An apparatus for use in controlling molecular clusters in a liquid as claimed in claim 2, wherein said pipe is divided at least into two pipe sections and said energy applying device is provided between said pipe sections with an inner peripheral surface of said energy applying device exposed to an interior of said pipe.

6. An apparatus for use in controlling molecular clusters in a liquid as claimed in claim 2, wherein said at least two electrodes have different electrochemical potentials to provide a self generating electric field.

7. An apparatus for use in controlling molecular clusters in a liquid as claimed in claim 6, wherein one of said electrodes is carbon and the other of said electrodes is aluminum.

8. An apparatus for use in controlling molecular clusters in a liquid as claimed in claim 2, for use with an external electric supply source, wherein said at least two electrodes are energized from the external electric supply source.

9. An apparatus for use in controlling molecular clusters in a liquid as claimed in claim 1, wherein said energy applying device comprises at least two magnetic pole pieces and said pipe is made of non-magnetic material.

10. An apparatus for use in controlling molecular clusters in a liquid as claimed in claim 9, wherein said energy applying device is provided on an outer peripheral surface of said pipe.

11. An apparatus for use in controlling molecular clusters in a liquid as claimed in claim 9, wherein said energy applying device is provided internally of said pipe.

12. An apparatus for use in controlling molecular clusters in a liquid as claimed in claim 9, wherein said pipe is divided at least into two pipe sections and said energy applying device is provided between said pipe sections with an inner peripheral surface of said energy applying device exposed to an interior of said pipe.

13. An apparatus for use in controlling molecular clusters in a liquid as claimed in claim 9, further comprising a permanent magnet, wherein said at least two magnetic pole pieces are energized by said permanent magnet.

14. An apparatus for use in controlling molecular clusters in a liquid as claimed in claim 9, further comprising an electro-magnetic device, wherein said at least two magnetic pole pieces are energized by said electro-magnetic device.

15. An apparatus for use in controlling molecular clusters in a liquid as claimed in claim 1, wherein said energy applying device is at least two electrode members edgewise encircling said pipe and spaced apart by an electrically insulating film interposed therebetween.

16. An apparatus for use in controlling molecular clusters in a liquid as claimed in claim 1, wherein said energy applying device is at least two electrode members edgewise encircling said pipe.

17. A method for use in controlling molecular clusters in a liquid, said method comprising:
producing an energy field with at least two energy applying members comprising two electrodes or two magnetic pole pieces provided along a periphery of a pipe in a direction transverse to a liquid flow direction; and
flowing the liquid transversely through the energy field, wherein the at least two energy applying members are spaced apart less than 1 mm.

18. A method for use in controlling molecular clusters in a liquid as claimed in claim 17, wherein the energy applying members comprise two electrodes having different electrochemical potentials than each other for self energizing.

19. A method for use in controlling molecular clusters in a liquid as claimed in claim 18, wherein the energy applying members are spaced apart by an insulating film therebetween.

20. A method for use in controlling molecular clusters in a liquid as claimed in claim 17, wherein the energy applying members comprise two electrodes to be energized by an external electric supply source.

21. A method for use in controlling molecular clusters in a liquid as claimed in claim 20, wherein the energy applying members are spaced apart by an insulating film therebetween.

22. A method for use in controlling molecular clusters in a liquid as claimed in claim 17, wherein the energy applying members are magnetic pole pieces and are energized by a permanent magnet.

23. A method for use in controlling molecular clusters in a liquid as claimed in claim 22, wherein the energy applying members are spaced apart by an insulating film therebetween.

24. A method for use in controlling molecular clusters in a liquid as claimed in claim 22, wherein the energy applying members are in direct physical contact with each other.

25. A method for use in controlling molecular clusters in a liquid as claimed in claim 22, wherein said magnetic pole pieces are spaced apart by a non-magnetic medium.

26. A method for use in controlling molecular clusters in a liquid as claimed in claim 17, wherein the energy applying members comprise two magnetic pole pieces energized by an electromagnetic device.

27. A method for use in controlling molecular clusters in a liquid as claimed in claim 26, wherein the energy applying members are spaced apart by an insulating film therebetween.

28. A method for use in controlling molecular clusters in a liquid as claimed in claim 26, wherein the energy applying members are in direct physical contact with each other.

29. A method for use in controlling molecular clusters in a liquid as claimed in claim 26, wherein said magnetic pole pieces are spaced apart by a non-magnetic medium.

* * * * *